(12) United States Patent
Tipper

(10) Patent No.: US 7,555,226 B2
(45) Date of Patent: Jun. 30, 2009

(54) AUTOMATIC BIAS CONTROL FOR AN OPTICAL MODULATOR

(75) Inventor: Alan Tipper, Exeter (GB)

(73) Assignee: Bookham Technology plc, Northamptonshire (GB)

( * ) Notice: Subject to any disclaimer, the term of this patent is extended or adjusted under 35 U.S.C. 154(b) by 304 days.

(21) Appl. No.: 11/176,703

(22) Filed: Jul. 7, 2005

(65) Prior Publication Data

US 2006/0034616 A1    Feb. 16, 2006

(30) Foreign Application Priority Data

Aug. 13, 2004 (GB) .................................. 0418091.5

(51) Int. Cl.
    *H04B 10/04* (2006.01)
(52) U.S. Cl. ..................... 398/198; 398/183; 398/192; 398/186; 398/196; 398/197; 359/245; 359/247; 359/237; 372/32; 372/34; 372/36; 385/1; 385/2; 385/3; 385/4; 385/14
(58) Field of Classification Search ................. 398/182, 398/183, 184, 185, 186, 187, 188, 192, 193, 398/194, 195, 196, 197, 189, 198, 200, 201; 359/245, 276, 279, 280, 246, 240, 247, 237; 385/2, 4, 8, 1, 3, 14, 140; 372/26, 29, 38, 372/32, 34, 36
See application file for complete search history.

(56) References Cited

U.S. PATENT DOCUMENTS 5,003,624 A    3/1991    Terbrack et al.

(Continued)

FOREIGN PATENT DOCUMENTS

CN    1395771    2/2003

(Continued)

OTHER PUBLICATIONS

International Search Report for corresponding Application No. PCT/GB2005/050116 dated Oct. 25, 2005 with Written Opinion.

(Continued)

*Primary Examiner*—Hanh Phan
(74) *Attorney, Agent, or Firm*—Renner, Otto, Boisselle & Sklar, LLP

(57) ABSTRACT

An automatic bias controller for an optical modulator is provided. The automatic bias controller comprises a driver for providing an electrical data signal to the modulator and a bias voltage source for providing a bias voltage to the modulator. A microprocessor provides a low frequency digital modulation signal, which is converted to an analogue modulation signal by a digital to analogue converter. The analogue modulation signal is applied to the bias voltage source (so as to modulate the bias voltage) or to the driver (so as to modulate the amplitude of the data signal). Intensity detectors for detecting the intensity of light emitted by the modulator are provided, and an analogue to digital converter converts the output of the intensity detectors to a digital intensity signal which is passed to the microprocessor. The digital intensity signal is analysed, and the bias voltage source instructed to adjust the bias voltage on the basis of the analysed signal. The digital modulation signal is preferably a rectangular wave or time multiplexed series of periods in which the bias voltage and data signal amplitude are varied.

32 Claims, 2 Drawing Sheets

U.S. PATENT DOCUMENTS

| | | | |
|---|---|---|---|
| 5,170,274 A | | 12/1992 | Kuwata et al. |
| 5,343,324 A | * | 8/1994 | Le et al. .................... 398/198 |
| 5,440,113 A | * | 8/1995 | Morin et al. ................ 250/205 |
| 5,495,359 A | * | 2/1996 | Gertel et al. ................ 359/245 |
| 5,726,794 A | | 3/1998 | Tajima |
| 6,163,395 A | * | 12/2000 | Nemecek et al. ............ 398/198 |
| 6,700,907 B2 | * | 3/2004 | Schneider et al. ............ 372/26 |
| 6,931,214 B1 | * | 8/2005 | Carrick et al. .............. 398/198 |
| 7,075,695 B2 | * | 7/2006 | Gronbach .................. 359/245 |
| 7,092,643 B2 | * | 8/2006 | Kajiya et al. ................ 398/198 |
| 7,184,671 B2 | * | 2/2007 | Wang ........................ 398/195 |
| 7,308,210 B2 | * | 12/2007 | Khayim et al. .............. 398/198 |
| 7,369,290 B1 | * | 5/2008 | Cox et al. .................... 359/239 |
| 2005/0226638 A1 | * | 10/2005 | Nesset et al. ................ 398/188 |

FOREIGN PATENT DOCUMENTS

| | | |
|---|---|---|
| CN | 1450382 | 10/2003 |
| EP | 1335242 | 8/2003 |
| EP | 1 571 484 | 9/2005 |
| FR | 2 830 088 | 3/2003 |
| WO | 2004/072715 | 8/2004 |

OTHER PUBLICATIONS

Yang, C.R., et al.; "Off-level sampling method for bias stabilisation of electro-optic Mach-Zehnder modulator"; Electronics Letters, IEE Stevenage; GB, vol. 35, No. 7, Apr. 1, 1999; pp. 590-591; XP006011957.

Magoon, V. et al.; "Electronic linearization and bias control for externally modulated fiber optic link"; Sep. 11, 2000; Microwave Photonics; International Topical Meeting on Sep. 11-13, 2000, Piscataway, NJ; IEEE, pp. 145-147; XP010526314.

UK Search Report for corresponding Application No. 0418091.5 dated Dec. 13, 2004.

British Office Action for corresponding Application No. GB0418091.5 dated Sep. 26, 2007.

Chinese Office Action for corresponding Application No. 200580027611.4 dated Nov. 2, 2007.

* cited by examiner

AUTOMATIC BIAS CONTROL FOR AN OPTICAL MODULATOR

FIELD OF THE INVENTION

The present invention relates to an automatic bias controller for an optical modulator for use in optical data communications, and more specifically, although not exclusively, to an automatic bias controller for an electro-optic modulator such as a Mach-Zehnder modulator. The invention also relates to an optical transmitter including a modulator with automatic bias control.

BACKGROUND OF THE INVENTION

Transmission of data using optical carriers enables very high bandwidths and numbers of multiplexed channels with low signal loss and distortion. A coherent laser light beam is amplitude modulated with a data signal, and propagates to a remote receiver via a system of optical fibres and repeaters. The light beam may advantageously be modulated with electrical signals in the microwave frequency range using an electro-optic modulator such as a Mach-Zehnder modulator or optical coupler.

Mach-Zehnder electro-optic modulators are well known. An electro-optic modulator based on a Mach-Zehnder interferometer generally includes a monolithic substrate formed of an electro-optic material such as $LiNbO_3$ or InP. An optical waveguide is formed in the substrate having two arms or branches which extend generally in parallel with each other. The effective index of refraction of the material in the waveguide is higher than the index of refraction of the material of the substrate.

In the absence of an applied electrical bias voltage, an input optical or light beam produced by a laser or the like applied to the waveguide divides between the branches. The optical signals propagating through the branches recombine at the optical output of the waveguide. If the optical path lengths of the branches are equal, or differ by an integral number of wavelengths, then the optical signals recombine in phase with each other, such that their amplitudes are additive and an optical output signal which is essentially similar to the optical input signal appears at the output of the waveguide.

If the optical path lengths of the branches differ by a half integral number of wavelengths, the optical signals emerging from the branches are 180° out of phase with each other. The amplitudes of the signals combine subtractively, cancelling each other out, such that a zero output is produced at the optical output.

Application of a predetermined electrical bias voltage differential to one branch of the waveguide relative to the other branch causes the complex indices of refraction of the material in the branches to vary differently due to the electro-optic effect, such that the effective optical lengths (and absorption) of the branches vary accordingly. At a bias voltage known in the art as $V_\pi$, the effective optical lengths have varied to such an extent that the optical signals emerging from the branches are 180° out of phase compared to the situation when no bias voltage is applied. If the path lengths of an unbiased modulator are the same, then at a bias voltage of $V_\pi$ the optical signals will interfere destructively and cancel each other out, such that a zero output is produced at the optical output. If the path lengths of an unbiased modulator differ by a half integral number of wavelengths, then at a bias voltage of $V_\pi$ the optical signals will interfere constructively so that the optical output signal is essentially similar to the optical input signal. An electrical data signal, normally in the microwave frequency range, is applied to one or both of the arms. The optical carrier signal exiting the device is thus modulated by the data signal For most optical communication applications, it is desirable to bias the modulator at a voltage $V_\pi/2$. However, device instabilities and environmental effects, especially temperature variations, cause the operating point to drift over time, and constant readjustment is required to maintain the proper operating point. The bias point must be maintained during operation to achieve maximum dynamic range, since second order harmonic distortion increases rapidly with increasing bias voltage error.

The bias point is generally maintained by providing a low frequency (~400 Hz) sinusoidal pilot tone to the bias voltage or to the data signal. This causes a further low frequency modulation in the output signal, whose phase and amplitude is determined by the distance from the bias point. The output arm of the modulator includes a tap to a photodetector, enabling the output signal to be monitored. The output signal is compared with the pilot tone using a phase sensitive detector, and this enables the use of a feedback loop to maintain the bias point. Examples of modulators employing such a system are described in U.S. Pat. No. 5,003,624 (in which the pilot tone is applied to the bias voltage) and U.S. Pat. No. 5,170,274 (in which the pilot tone is applied to the data signal).

A known electro-optic modulator system including an automatic bias adjustment is illustrated in FIG. 1, and generally designated 10. A laser 12 feeds a coherent light beam through an optical fibre 14 into an optical input 16 of a Mach-Zehnder modulator 18, optical coupler, or other appropriate electro-optic modulator. The light beam propagates through a waveguide having two branches 20 and 22, which recombine at an optical output 24 of the modulator 18. An electrical data signal, preferably in the microwave frequency range, is applied to the branches 20, 22 via a driver 25 and modulation signal "T" inputs 26, 27. A bias voltage is also applied to the branches 20, 22 via the "T" inputs 26, 27. The optical carrier signal constituted by the laser beam is modulated with the data signal, and fed through an optical fibre 28 to a remote receiver (not shown). An amplitude modulation (AM) pilot tone source 29 is applied to the driver of the data signal.

A tap 30 is provided in the output optical fibre 28 which leads through an optical fibre pigtail 32 to a photodetector 34. The output of the photodetector 34 and the pilot tone modulating signal 29 are applied to a phase sensitive detector 36, which compares the low frequency modulation of the output signal with the pilot tone 29. Depending on the phase and amplitude of the modulation on the output signal, the bias voltage of the lower arm 20 of the modulator is adjusted to maintain the bias point.

This system works well but the tapping of some of the output signal to a photodetector represents optical loss. The overall transmitted power is therefore reduced. Furthermore, the generation of a sinusoidal pilot tone requires hardware which occupies valuable space near the modulator. The feedback loop also requires a phase sensitive detector and DC coupled amplifiers which are expensive and again occupy valuable space.

SUMMARY OF THE INVENTION

There is therefore a need for an automatic bias controller for an optical modulator which overcomes or at least mitigates the above problems.

In accordance with a first aspect of the present invention there is provided an automatic bias controller for an optical modulator, comprising:

a driver for providing an electrical data signal to the modulator;

bias means for providing a bias voltage to the modulator;

processing means for providing a low frequency digital modulation signal;

a digital to analogue converter for converting the digital modulation signal to an analogue modulation signal and providing the analogue modulation signal to the bias means so as to modulate the bias voltage or to the driver so as to modulate the amplitude of the data signal;

intensity detection means for detecting the intensity of light emitted by the modulator; and an analogue to digital converter arranged to convert the output of the intensity detection means to a digital intensity signal and provide the digital intensity signal to the processing means;

wherein the processing means is arranged to analyse the digital intensity signal and instruct the bias means to adjust the bias voltage on the basis of the analysed signal.

Thus there is no need for a costly and bulky tone generator or phase sensitive detector. The processing means (e.g. a microprocessor) can provide a simple digital signal, and analogue to digital converters and digital to analogue converters are usually present on a modulator board in any event. Thus space utilisation is improved.

The digital modulation signal is preferably a rectangular signal, enabling a simple comparison between the amplitude and phase of the digital intensity signal and the amplitude and phase of the digital modulation signal. A finite difference algorithm may be performed on the digital intensity signal so as to determine the approximate first or second derivative of the output power of the modulator with respect to bias voltage.

The digital modulation signal preferably comprises a series of discrete time periods, arranged such that during each period an increase or decrease in the amplitude of the data signal or the bias voltage is effected. The signal may be multiplexed so that the effect of the signal on the amplitude of the data signal or bias voltage can be determined from the behaviour of the corresponding period of the digital intensity signal. For example, the signal may change the bias voltage, then return the bias voltage to its original value and change the amplitude of the data signal.

The amplitude of the data signal is preferably controlled by the digital modulation signal to produce high amplitude periods of increased amplitude alternating with low amplitude periods of decreased amplitude. An error in the bias of the modulator may then be determined by computing the difference between the integrated intensity of the digital intensity signal during a high amplitude period and the integrated intensity of the digital intensity signal during a low amplitude period.

Similarly, the bias voltage is preferably controlled by the digital modulation signal to produce high bias periods of increased bias voltage alternating with low bias periods of low bias voltage. An error in the amplitude of the data signal may then be determined by computing the difference between the integrated intensity of the digital intensity signal during a high bias period and the integrated intensity of the digital intensity signal during a low bias period.

Preferably the intensity of light entering the modulator is controlled with a variable optical attenuator. By integrating the digital intensity signal over time, (i.e. determining the sum of the intensity signal over high/low amplitude and high/low bias periods rather than the difference between periods) the error in the power input to the modulator may be determined, and the variable optical attenuator may then be adjusted on the basis of the determined power input error.

Preferably the optical modulator is a Mach-Zehnder modulator having two branches. The output of the modulator preferably comprises a sum arm and a difference arm, the sum arm transmitting light having a waveform determined by the sum of the waveforms in the two branches, and the difference arm transmitting light having a waveform determined by the difference between the waveforms in the two branches. The modulated optical light is preferably transmitted in the sum arm.

The intensity of light in the difference arm provides a measure of the intensity of the light in the sum arm when integrated over time (i.e. over many bits of the data signal). The frequency of the digital modulation signal ($\sim 10^2$ Hz) is much lower than the frequency of the data signal ($\sim 10^9$ Hz), so over the course of a single period of the digital modulation signal there are millions of bits transmitted. The detection of the intensity of light emitted by the modulator may therefore be achieved by measuring the intensity of light in the difference arm. This means that there is no need to tap the sum arm carrying the modulated light, and thus no loss in the transmitted light.

Preferably the output of the modulator comprises a multi-mode interferometer which causes the sum waveform to be transmitted in the sum arm and the difference waveform in the difference arm.

In accordance with a second aspect of the present invention there is provided a method for controlling the bias of an optical modulator, comprising:

providing an electrical data signal to the modulator;

providing a bias voltage to the modulator;

providing a low frequency digital modulation signal from a processing means;

converting the digital modulation signal to an analogue modulation signal;

providing the analogue modulation signal to the bias means so as to modulate the bias voltage or to the driver so as to modulate the amplitude of the data signal;

detecting the intensity of light emitted by the modulator;

converting the detected intensity to a digital intensity signal;

providing the digital intensity signal to the processing means;

analysing the digital intensity signal at the processing means; and adjusting the bias voltage on the basis of the analysed signal.

BRIEF DESCRIPTION OF THE DRAWINGS

Some preferred embodiments of the invention will now be described by way of example only and with reference to the accompanying drawings, in which.

DETAILED DESCRIPTION OF THE PREFERRED EMBODIMENT

Figure 2:
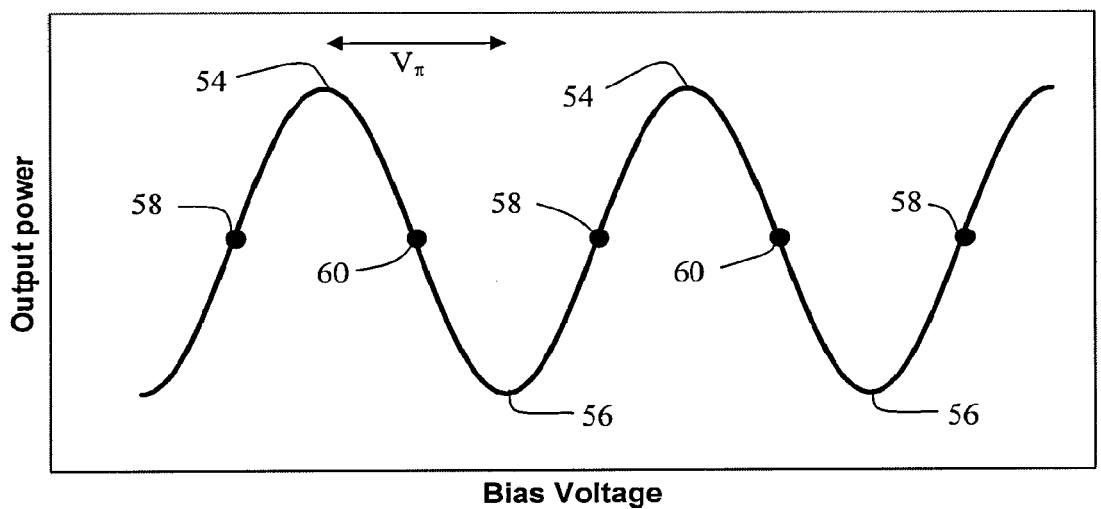
FIG. 2 is a graph illustrating the transfer function of a Mach-Zehnder modulator, with the optical output plotted as a function of applied bias voltage.

FIG. 2 is a graph showing how the optical power output of a Mach-Zehnder modulator depends on the relative bias voltage between the arms. It is clear from the figure that, as the bias voltage is increased, the optical power increases and decreases in a periodic manner. The sine curve shown in FIG. 2 has a plurality of peaks 54 and a plurality of troughs 56. Bias points 58 are constituted by positive inflection points in the rising portions of the curve between adjacent troughs 56 and peaks 54, whereas bias points 60 are similarly constituted by negative inflection points between adjacent peaks 54 and troughs 56. The bias points 58, 60 have voltage values approximately half way between those of the peaks 54 and troughs 56, and are the points $V_\pi/2$ referred to above.

Figure 1:
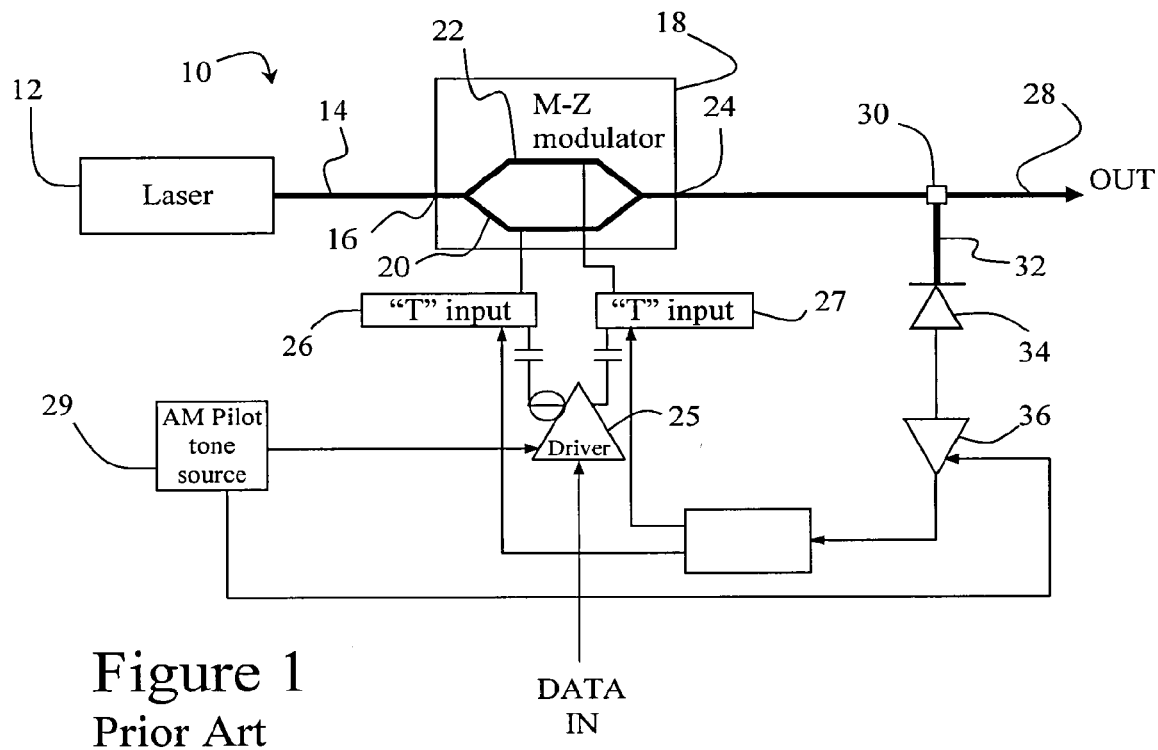
FIG. 1 is a simplified block diagram illustrating a prior art electro-optic modulator having automatic bias adjustment.
Figure 3:
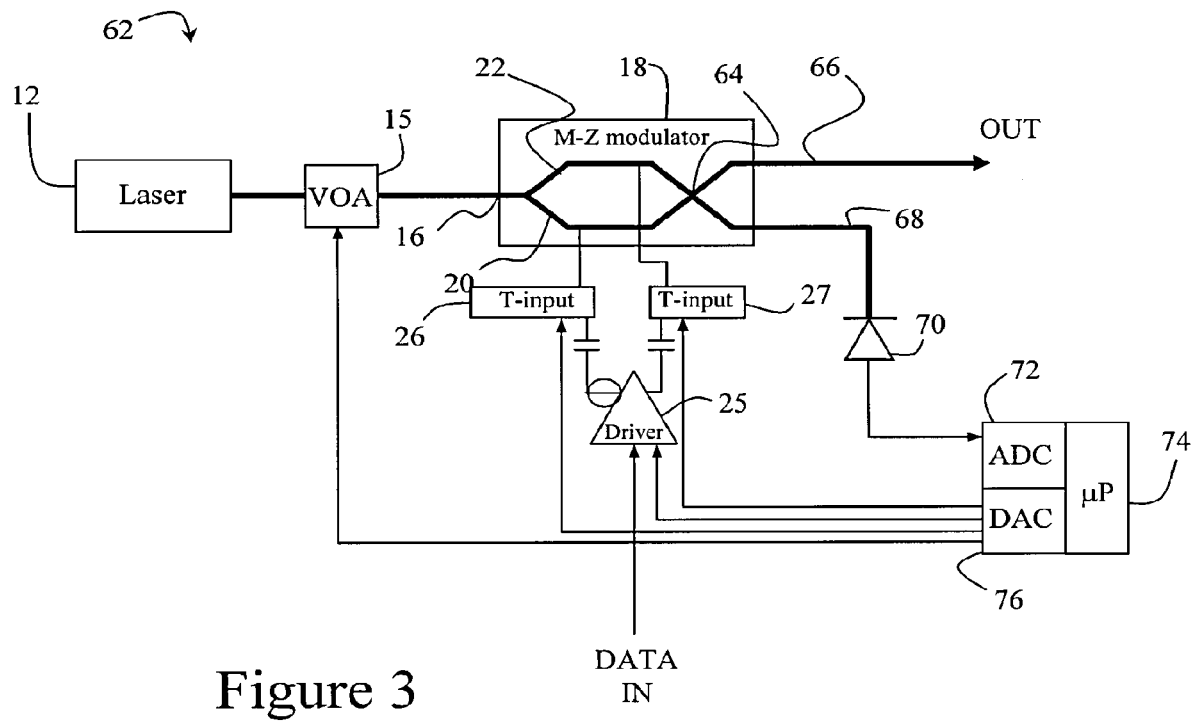
FIG. 3 is a simplified block diagram illustrating a modulator including an automatic bias control embodying the present invention.

FIG. 3 is a simplified block diagram of a modulator system 62 in accordance with the present invention. Components similar to those of FIG. 1 are represented by the same reference numerals. A laser 12 feeds a coherent light beam through a variable optical attenuator (VOA) 15 into an optical input 16 of a Mach-Zehnder modulator 18 having two branches 20, 22. The branches 20, 22 recombine at a 2×2 multimode interferometer (MMI) 64 having a "sum" output arm 66 and "difference" output arm 68. An electrical data signal is applied to the branches 20, 22 via a driver 25 and modulation signal "T" inputs 26, 27. A bias voltage is also applied to the branches 20, 22 via the "T" inputs 26, 27

The waveform of light exiting the MMI 64 via the "sum" arm 66 is the sum of the waveforms of light passing through the two arms 20, 22 of the modulator 18. The sum arm 66 forms the output of the modulator, through which the modulated light is transmitted. The waveform of light exiting the MMI 64 via the "difference" arm 68 is the difference of the waveforms of light passing through the two arms 20, 22. When the optical path difference between the two arms 20, 22 is an integral number of wavelengths (a phase difference of $2n\pi$), the light interferes constructively in the sum arm 66 (known as the "ON" state of the modulator), and no light passes through the difference arm 68. However, when the phase of the arms differs by $(2n+1)\pi$ where n is an integer, the light interferes destructively in the sum arm 66 (the "OFF" state) so that the intensity in the sum arm is zero, and light exits the modulator through the difference arm 68.

Since the modulator switches between the "ON" and "OFF" states at a very high frequency when data is being transmitted, the integrated light intensity in the difference arm over many bits can be taken to be proportional to the integrated light intensity in the sum arm over the same time when the modulator is biased at $V_\pi/2$. A photodetector 70 is provided at the output of the difference arm. The output of the photodetector 70 is passed to an analogue to digital converter (ADC) 72 to generate a digital signal, which is received by a microprocessor 74. This signal can then be used to monitor the output of the modulator without the need to tap light from the sum arm 66.

Figure 4:
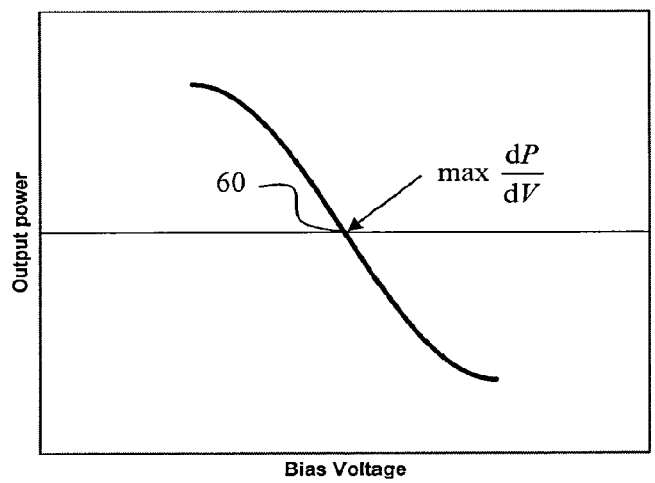
FIG. 4 is a graph illustrating the linear modulation bias point of a Mach-Zehnder modulator.

With a symmetrical modulation characteristic the mean output power (transmitted through the sum arm 66) is constant independent of small amplitude variations in the microwave frequency modulation voltage if the device is biased at its point 60 of maximum modulus of 1st derivative, as shown in FIG. 4. At this point, the second derivative of the power output with respect to voltage bias should be zero. If biased away from this ideal then the mean output is intensity modulated by the applied signal with its phase reversing as the bias passes through the ideal point. This is therefore suitable for bias error detection schemes.

This can be expressed mathematically using a Taylor expansion of the modulation characteristic as:

$$I(v) = f(vbias) + vf'(vbias) + \frac{v^2}{2!}f''(vbias) + \text{higher terms}$$

where I is the current measured by the photodetector 70 and representative of the output signal, v the coupled modulation voltage and f(vbias) the nonlinear transfer function of the modulator.

The microprocessor 74 provides a digital signal which is passed through a digital to analogue converter (DAC) to the driver 25. This signal causes the modulation depth of the data signal to be increased and decreased at a low rate (~100–500 Hz) by an amount m. This change in modulation depth is provided as a simple step function resulting in a low frequency square wave. Thus $$v = (1 \pm m)g(t)$$

where g(t) is the modulation signal. This means that there are two discrete values of I corresponding to the two discrete values of v, and $$<I_{+m}> - <I_{-m}> = 2mf'' <g^2(t)> + \text{higher terms}$$

where $<I_{+m}>$ is the current from the photodetector 70 when the modulation depth is (1+m) and $<I_{-m}>$ is the current when the modulation depth is (1−m).

This means that the second derivative of the modulation characteristic (and thus the bias error) can be determined by monitoring the amplitude and sign of the ripple in the photodetector current. The digital signal received at the microprocessor from the photodetector 70 via the ADC 72 is either exactly in phase or exactly out of phase with the square wave amplitude modulation applied to the data signal. There is no need for a phase sensitive detector, since the square wave applied to the data signal is generated by the same microprocessor 74.

The microprocessor 74 acts as a digital integrator to determine the sign and magnitude of the second derivative, and produces a digital signal to correct for this. This signal is passed through the DAC 76 to the driver 25 to enable the bias of the arms 20, 22 to be corrected. The linear bias can be maintained either at a positive or negative chirp configuration (points 58, 60 in FIG. 2) simply by changing the sign in the gain feedback loop.

In addition to determining the error in the biasing point, the modulator system 62 can be used to ensure a constant mean output power by the provision of a variable optical attenuator (VOA) 15 located between the laser 12 and modulator 18. In addition to determining the difference $<I_{+m}> - <I_{-m}>$ between the outputs in the photodetector current, the microprocessor determines the sum $<I_{+m}> + <I_{-m}>$, which provides a measure of the mean output power of the modulator. In order to keep this at a constant value a compensating signal is emitted from the microprocessor, via the DAC 76, to the VOA 15.

The system may also be modified to ensure that the amplitude of the modulation is correct, to ensure that the "ON" and "OFF" states ("1" and "0" bits) correspond to constructive and destructive interference in the sum arm 66—i.e. the peaks 54 and troughs 56 shown in FIG. 2. This is achieved by increasing and decreasing the bias voltage slightly by an amount $\delta V$ using a signal from the microprocessor 74 transmitted via the DAC 76 and the "T" inputs 26, 27 to the arms 20, 22. The difference $<I_{+\delta V}>-<I_{-\delta V}>$ between the photodetector currents corresponding to an increase and decrease in the bias voltage provides a measure of the modulation depth.

Because the signals to the driver 25 and bias arms 20, 22 to vary the modulation depth and bias voltage, respectively, are controlled by the microprocessor 74 and passed through the DAC 76, it is simple to ensure that they are multiplexed so that variations in the photodetector current may easily be assigned to the correct signal. In a suitable scheme the microprocessor applies initial voltages to the modulator arms, the driver gain input and the VOA input. It then applies incremental steps to the gain set and bias of one of the arms in the following sequence:

| Step number | Vbias | Vmod | Photodetector Current |
|---|---|---|---|
| 1 | Nominal | Nominal + m | $I_{+m}$ |
| 2 | Nominal | Nominal − m | $I_{-m}$ |
| 3 | Nominal + $\delta V$ | Nominal | $I_{+\delta V}$ |
| 4 | Nominal − $\delta V$ | Nominal | $I_{-\delta V}$ |

As explained above the difference $<I_{+m}>-<I_{-m}>$ is a direct measure of the error in the biasing point and indicates the direction in which the bias voltage should be incremented in order to operate at the point of zero second derivative of the power output-voltage characteristic. The difference $<I_{+\delta V}>-<I_{-\delta V}>$ is a direct measure of the error in the modulation swing and indicates the direction the Vmod voltage should be incremented to place the "1"s and "0"s at the peaks and troughs of the power-voltage characteristic. The sum photodetector current $I_S=<I_{+m}>+<I_{-m}>+<I_{+\delta V}>+<I_{-\delta V}>$ is a direct measure of the output power and indicates the direction the VOA voltage should be incremented to maintain a constant mean output power.

The embodiment described above applies to a modulator whose "ON" and "OFF" states (i.e. "1" and "0" bits) correspond to constructive and destructive interference in the sum arm 66. Referring back to FIG. 2, a "1" is transmitted at a peak 54 and a "0" at a trough 56. The modulator is maintained at a bias point corresponding to a point of inflection 58 or 60 between the peaks and troughs. However, it is possible to operate the modulator so that "1" and "0" bits correspond to constructive interference in the sum arm 66 but with opposite phases—i.e. to adjacent peaks 54. In such a situation the bias should be maintained at a trough 56 so that the modulation moves the output between peaks 54.

In a further embodiment, it is also possible to deliver a "duobinary" signal, in which the data signal is a three level waveform having "1", "0" and "−1" levels, in which the adjacent peaks 54 correspond to "1" and "−1" bits and the trough 56 between them corresponds to a "0" bit. In this embodiment the bias should again be maintained at a trough 56.

Since the power output is at a trough rather than a point of inflection at the point at which the bias needs to be maintained, a feedback loop based on the second derivative is not appropriate for these latter two embodiments. To maintain the bias at the trough 56 the bias should be varied by $\delta V$ as described above. Then $<I_{+\delta V}>-<I_{-\delta V}>$ provides a measure of the error in the biasing point.

Thus the invention, at least in its preferred embodiments, provides a number of advantages. The use of a "difference" output of the modulator allows optical power to be supplied for detection without reducing the power available for transmission.

The use of rectangular modulation (provided by a microprocessor and DAC) on the bias and/or data signals removes the need for tone generating hardware, reducing the number of components required.

The use of finite difference algorithms, in firmware running on a microprocessor to compute approximate derivatives of the power-voltage characteristic from the rectangular modulation avoids the need for tone based phase sensitive detectors or analogue multipliers, further reducing the number of components required.

The use of time division multiplexing of the rectangular bias and data modulation removes the need for additional hardware or orthogonal signals to separate control loops.

The use of a VOA to maintain the mean output power constant compensates for variation in optical input coupling during operation of the modulator.

The use of adjustable loop gain polarity achieves chirp configurability without the need for additional hardware.

It will be appreciated that variations from the above embodiments may still fall within the scope of the invention. For example, the digital control circuit shown in FIG. 3 detects light intensity using the difference arm of a four port modulator, but the circuit will work equally well if light is tapped from the output arm of a three port modulator.

In addition, the embodiments are described as using a single microprocessor, ADC and DAC. It will be appreciated that more than one of each of these components may be used (for example, to perform different functions) if necessary.

The invention claimed is:

1. An optical modulation system for transmitting modulated optical light comprising an optical modulator and an automatic bias controller, the modulator having an output comprising an output arm through which modulated light is transmitted and a difference arm complementary to the output arm, the automatic bias controller comprising:
   a driver for providing an electrical data signal to the modulator;
   bias means for providing a bias voltage to the modulator;
   processing means for providing a low frequency digital modulation signal;
   a digital to analogue converter for converting the digital modulation signal to an analogue modulation signal and providing the analogue modulation signal to the bias means so as to modulate the bias voltage or to the driver so as to modulate the amplitude of the data signal;
   intensity detection means for detecting the intensity of light emitted in the difference arm of the modulator; and
   an analogue to digital converter arranged to convert the output of the intensity detection means to a digital intensity signal and provide the digital intensity signal to the processing means;
   wherein the processing means is arranged to analyse the digital intensity signal and instruct the bias means to adjust the bias voltage on the basis of the analysed signal.

2. The optical modulation system of claim 1 wherein the digital modulation signal is a rectangular signal.

3. The optical modulation system of claim 1 wherein the processing means is arranged to compare the amplitude and phase of the digital intensity signal with the amplitude and phase of the digital modulation signal.

4. The optical modulation system of claim 1, wherein the processing means is arranged to perform a finite difference algorithm on the digital intensity signal so as to determine the approximate first derivative of the output power of the modulator with respect to bias voltage.

5. The optical modulation system of claim 1 wherein the processing means is arranged to perform a finite difference algorithm on the digital intensity signal so as to determine the approximate second derivative of the output power of the modulator with respect to bias voltage.

6. The optical modulation system of claim 1 wherein the digital modulation signal comprises a series of discrete time periods, arranged such that during each period an increase or decrease in the amplitude of the data signal or the bias voltage is effected.

7. The optical modulation system of claim 6, wherein the digital modulation signal is time multiplexed so that the effect of the signal on the amplitude of the data signal or bias voltage can be determined from the behaviour of the corresponding period of the digital intensity signal.

8. The optical modulation system of claim 1, arranged so that the amplitude of the data signal is controlled by the digital modulation signal to produce high amplitude periods of increased amplitude alternating with low amplitude periods of decreased amplitude, and wherein the processing means is arranged to determine an error in the bias of the modulator by computing the difference between the integrated intensity of the digital intensity signal during a high amplitude period and the integrated intensity of the digital intensity signal during a low amplitude period.

9. The optical modulation system of claim 1, arranged so that the bias voltage is controlled by the digital modulation signal to produce high bias periods of increased bias voltage alternating with low bias periods of low bias voltage, and wherein the processing means is arranged to determine an error in the amplitude of the data signal by computing the difference between the integrated intensity of the digital intensity signal during a high bias period and the integrated intensity of the digital intensity signal during a low bias period.

10. The optical modulation system of claim 1, further comprising a variable optical attenuator for controlling the intensity of light entering the modulator.

11. The optical modulation system of claim 10, wherein the processing means is arranged to integrate the digital intensity signal over time to determine an error in the power input to the modulator and to pass a digital intensity adjustment signal to the digital to analogue converter to control the variable optical attenuator on the basis of the determined power input error.

12. The system of claim 1, wherein the optical modulator is a Mach-Zehnder modulator having first and second branches.

13. The system of claim 12, wherein the output arm of the modulator is a sum arm which transmits light having a waveform determined by the sum of the waveforms in the first and second branches, and wherein the difference arm transmits light having a waveform determined by the difference between the waveforms in the first and second branches.

14. The system of claim 13, wherein the output of the modulator comprises a multimode interferometer, the multimode interferometer acting to cause the sum waveform to be transmitted in the sum arm and the difference waveform in the difference arm.

15. The system of claim 13, wherein modulated optical light is transmitted in the sum arm.

16. The system of claim 13, wherein the intensity of light in the difference arm provides a measure of the intensity of the light in the output arm when integrated over time.

17. A method for controlling the bias of an optical modulator having an output comprising an output arm through which modulated light is transmitted and a difference arm complementary to the output arm, comprising:
    providing an electrical data signal by a driver to the modulator
    providing a bias voltage by a bias means to the modulator;
    providing a low frequency digital modulation signal from a processing means;
    converting the digital modulation signal to an analogue modulation signal;
    providing the analogue modulation signal to the bias means so as to modulate the bias voltage or to the driver so as to modulate the amplitude of the data signal;
    detecting the intensity of light emitted by the difference arm of the modulator;
    converting the detected intensity to a digital intensity signal;
    providing the digital intensity signal to the processing means;
    analysing the digital intensity signal at the processing means; and
    adjusting the bias voltage on the basis of the analysed signal.

18. The method of claim 17, wherein the digital modulation signal is a rectangular signal.

19. The method of claim 18, comprising comparing the amplitude and phase of the digital intensity signal with the amplitude and phase of the digital modulation signal.

20. The method of claim 17, comprising performing a finite difference algorithm on the digital intensity signal so as to determine the approximate first derivative of the output power of the modulator with respect to bias voltage.

21. The method of claim 17, comprising performing a finite difference algorithm on the digital intensity signal so as to determine the approximate second derivative of the output power of the modulator with respect to bias voltage.

22. The method of claim 17, wherein the digital modulation signal comprises a series of discrete time periods, arranged such that during each period an increase or decrease in the amplitude of the data signal or the bias voltage is effected.

23. The method of claim 22, wherein the digital modulation signal is time multiplexed so that the effect of the signal on the amplitude of the data signal or bias voltage can be determined from the behaviour of the corresponding period of the digital intensity signal.

24. The method of claim 17, wherein the amplitude of the data signal is controlled by the digital modulation signal to produce high amplitude periods of increased amplitude alternating with low amplitude periods of decreased amplitude, the method further comprising determining an error in the bias of the modulator by computing the difference between the integrated intensity of the digital intensity signal during a high amplitude period and the integrated intensity of the digital intensity signal during a low amplitude period.

25. The method of claim 17, wherein the bias voltage is controlled by the digital modulation signal to produce high bias periods of increased bias voltage alternating with low bias periods of low bias voltage, the method further comprising determining an error in the amplitude of the data signal by computing the difference between the integrated intensity of the digital intensity signal during a high bias period and the integrated intensity of the digital intensity signal during a low bias period.

26. The method of claim 17, further comprising controlling the intensity of light entering the modulator with a variable optical attenuator.

27. The method of claim 26, further comprising integrating the digital intensity signal over time to determine an error in the power input to the modulator and adjusting the variable optical attenuator on the basis of the determined power input error.

28. The method of claim 17, wherein the optical modulator is a Mach-Zehnder modulator having first and second branches.

29. The method of claim 28, wherein the output arm of the modulator is a sum arm which transmits light having a waveform determined by the sum of the waveforms in the first and second branches, and wherein the difference arm transmits light having a waveform determined by the difference between the waveforms in the first and second branches.

30. The method of claim 29, wherein the output of the modulator comprises a multimode interferometer, the multimode interferometer acting to cause the sum waveform to be transmitted in the sum arm and the difference waveform in the difference arm.

31. The method of claim 29, wherein the modulated optical light is transmitted in the sum arm.

32. The method of claim 29, wherein the intensity of light in the difference arm provides a measure of the intensity of the light in the sum arm when integrated over time.

* * * * *